United States Patent [19]

Sharp et al.

[11] 3,845,610

[45] Nov. 5, 1974

[54] BLADE CONSTRUCTION FOR FRUIT HARVESTING MACHINE

[76] Inventors: James G. Sharp; David E. Sharp, both of Rt. 104, North Rose, N.Y. 14516

[22] Filed: Sept. 10, 1973

[21] Appl. No.: 395,652

Related U.S. Application Data

[63] Continuation-in-part of Ser. No. 235,524, March 17, 1972, Pat. No. 3,777,462.

[52] U.S. Cl. .............................. 56/328 R, 56/400
[51] Int. Cl. .......................................... A01d 51/00
[58] Field of Search .......... 56/400, 328 R, 295, 364

[56] References Cited

UNITED STATES PATENTS

| | | | |
|---|---|---|---|
| 3,295,302 | 1/1967 | Lee | 56/400 X |
| 3,343,351 | 9/1967 | Freedlander et al. | 56/295 |
| 3,475,889 | 11/1969 | Overstreet et al. | 56/328 R |
| 3,616,631 | 11/1971 | Quam | 56/400 |

FOREIGN PATENTS OR APPLICATIONS 1,479,644  3/1967  France .................................. 56/400

*Primary Examiner*—Hugh R. Chamblee
*Assistant Examiner*—J. N. Eskovitz
*Attorney, Agent, or Firm*—Charles S. McGuire

[57] ABSTRACT

In a harvesting machine for picking up, windrowing, or the like, fruit such as apples, lying on the ground, a blade construction for attachment to a rotatable support for contacting and moving the fruit. The blades are formed from a moldable material, such as urethane plastic, having physical properties which provide optimum performance both in contacting and moving the fruit and withstanding breakage from striking other objects. The individual blades are essentially flat and elongated, having a length several times the width and a cross sectional area greater at the end attached to the rotatable support than at the free tip and which contacts the fruit.

7 Claims, 4 Drawing Figures

PATENTED NOV 5 1974　　3,845,610

3,845,610

BLADE CONSTRUCTION FOR FRUIT HARVESTING MACHINE

REFERENCE TO RELATED APPLICATIONS

This is a continuation-in-part of co-pending application Ser. No. 235,524, filed Mar. 17, 1972, now U.S. Pat. No. 3,777,462, issued Dec. 11, 1973 of the same inventors for Fruit Harvester.

BACKGROUND OF THE INVENTION

This invention relates to harvesting machinery blades and, more particularly, to flexible blades attached to a rotating member for contacting, lifting and propelling crops such as fruit lying freely on the ground.

The prior art includes various forms of harvesting machinery for picking up fallen fruit, among which are machines for lifting the fruit with rotating blades or fingers and carrying it to conveyor means which discharge into an appropriate container. Applicants' above-referenced U.S. patent application, for example, discloses a machine of this type wherein the blades are attached at closely spaced intervals along the periphery of a rotatable shaft carried on the frame of the harvesting machine. As the machine is pulled, or otherwise moved through an orchard or grove where fallen fruit is lying on the ground, the free end portions of the blades contact and lift the fruit as the shaft to which they are attached rotates.

The terrain over which the machine operates is likely to include tree branches, stones and other foreign objects which the blades may strike with considerable force during operation. This commonly results in serious damage or complete breakage of the blades. Attempts to provide blades which are flexible enough to yield without breakage upon impact with large, solid objects have generally resulted in unsatisfactory performance in picking up the fruit.

It is a principal object of the present invention to provide a fruit harvesting machine pick-up blade which may be rigidly attached at one end to a rotating shaft and withstand damage due to impact with objects considerably larger and heavier than the fruit to be picked up, while operating with high efficiency in the retrieval of fallen fruit.

A further object is to provide a pick-up blade for collecting fallen fruit which has particular physical properties contributing to optimum performance and durability of the blades.

In a more general sense, the object of the invention is to provide a novel and improved blade for harvesting machinery of the type which collects fallen fruit, and the like.

SUMMARY OF THE INVENTION

In accordance with the foregoing objectives, the blade of the present invention is constructed in a configuration and of a material having physical properties which have been found to provide optimum desired characteristics. The preferred material is a molded polyurethane plastic, as disclosed later in more detail. The individual blades are elongated, having a length preferably at least five times their width, and have a cross sectional area at the end attached to the support greater than that at the free tip end.

The blades are flat on one side and include a rib along the center and each edge on the opposite side. The blade thickness is substantially constant from the attached end through the length of the ribs, and is reduced in the area between the ribs. The blades are arranged along the supporting structure in spaced relation. Preferably, the width of the blades is not greater than the nominal diameter of the fruit to be harvested, and the spacing between blades is about equal to or slightly less than the width of a single blade.

DETAILED DESCRIPTION

Figure 1:
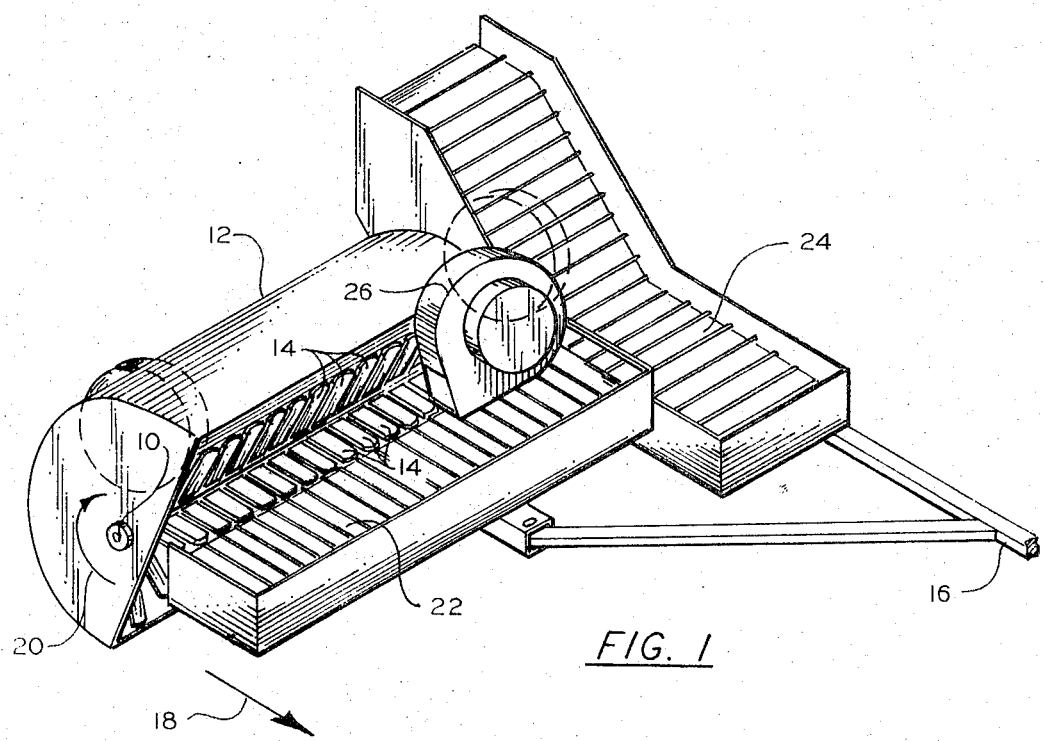
FIG 1 is a perspective view of the general type of harvesting machine wherein the blades may be employed.

Referring now to the drawing, in FIG. 1 is shown a fruit harvesting machine of the type which picks up loose fruit lying on the ground. The machine is shown somewhat diagrammatically being intended to indicate only the general type of equipment wherein the invention is employed. For a more complete description of a typical fruit pick-UP harvester using the blades of the present invention, reference may be had to applicants' aforementioned copending application.

The machine of FIG. 1 includes a rotatable shaft, one end of which is indicated by reference numberal 10, extending along the length of semi-circular shield 12. A plurality of blades 14 are fixedly attached to suitable brackets, or other supports, extending rigidly from shaft 10 to hold the blades in rows, each row being angularly spaced by e.g., 60° and the blades being laterally spaced along the row by a distance of from one-half to approximately one blade width.

The machine is attached to a tractor, or other motive means, by tongue 16 and the machine is moved in the direction of arrow 18 while shaft 10 rotates in the direction of arrow 20, power being provided, for example, by the tractor hydraulic system. Thus, the tips of blades 14 are moving rearwardly with respect to the direction of machine movement as they engage fruit lying on the ground. The tips of the blades pass close to the inner surface of shield 12, whereby the fruit is carried through the shield and propelled forwardly at the top of the blade travel. The fruit is caught on lateral conveyor 22 and discharged onto conveyor 24 which deposits the fruit in suitable containers. Blower 26 separates loose grass, leaves, and the like, which are picked up with the fruit and propelled forwardly by the blades.

Figure 2:
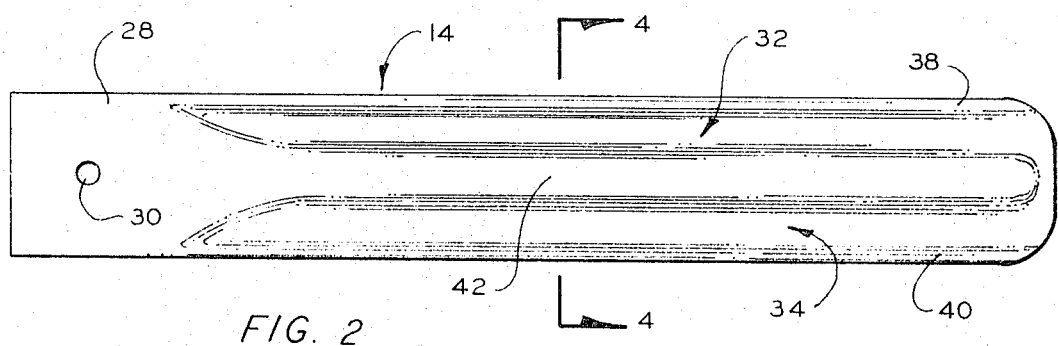
FIG 2 is a top plan view of the preferred embodiment of blade.
Figure 3:
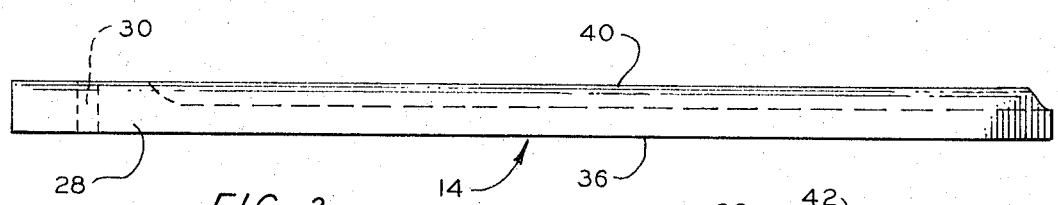
FIG. 3 is a side view of the blade of FIG 2.
Figure 4:
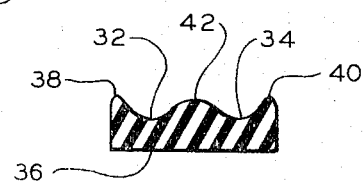
FIG. 4 is a sectional view taken on the line 4—4 of FIG. 2.

Referring now to FIGS. 2–4, constructional details of blades 14 are shown more clearly. The blades include a base portion 28 having opening 30 extending therethrough. A bolt or rivet is inserted through opening 30 and through a corresponding opening in the blade support to anchor the blade at base 28 to rotatable shaft 10. Base 28 is essentially square or rectangular in plan view, and rectangular in cross section, having a width several times its thickness.

Formed integrally with, and extending from base 28 is a portion of reduced cross section, representing the major part of the length of blade 14. The reduced cross section is provided by decreasing the thickness of the blade by means of depressions 32 and 34 in one surface. The opposite surface, denoted in FIGS. 3 and 4 by reference numeral 36, is essentially flat throughout the length of the blade. Depressions 32 and 34 have the effect of providing upstanding ribs 38 and 40 along each edge of the blade in the portion of reducte cross section. Likewise, central rib 42 extends along the longitudinal axis of this side of the blade. Ribs 38, 40 and 42 are of substantially the same thickness as base 28.

The physical properties of the blades, particularly tensile strength and durometer hardness have been found to be of extreme importance in providing a blade construction having the optimum desired qualities. It is considered necessary for the blades to have a tensile strength of at least 2,000 psi (ASTM D412) and Shore A hardness (10 seconds) of 80 to 90, Shore D hardness (10 seconds) of 40 to 50. Material elongation is also an important physical property. Blades made from material having an elongation of 600 percent (ASTM D 412) provide superior operating characteristics, although a range of 350 to 600 percent elongation will provide satisfactory performance.

The preferred material of which blades 14 are completely composed, is a room temperature cure, castable urethane system. Such systems include a resin and a curing agent, or hardener, which are mixed together in specified proportions, poured into molds and allowed to cure. One specific example of such a urethane system is that produced by mixing Hysol RU-2028 resin with Hysol TM 32 curing agent in a ratio of 100 to 35 parts by weight, respectively, or the same resin with Hysol TM 63 curing agent in a ratio of 100 to 38 parts by weight, respectively. These are manufactured by and commercially available from Hysol Division, The Dexter Corporation, Olean, N.Y. A second specific example is a mixture of 100 parts by weight of B635 resin with 8 parts by weight of 3080 curing agent of the castable urethane system manufactured by and available from Uniroyal Chemical, Elm Street, Naugatuck, Conn., under the trademark Vivrathane. Heat cure systems may also be used if setting time is of importance, but the aforementioned systems, with room temperature cure, provide a blade with the required physical properties. Physical properties of the material used in casting the blade may be enhanced by mixing uniformly therein a quantity of finely divided fibrous material, such as short strands of fine Nylon.

The blade design and material characteristics disclosed herein provide a fruit harvester blade with characteristics superior to previously used elements for such applications. The particular advantageous features of blades constructed according to the present invention are resilience, high tear strength, abrasion resistance, low temperature performance, and torsional and shock strength. The blades are of particular utility in harvesting machinery for picking up fallen fruit, but may also be useful in other applications, such as windrowing, and the like.

What is claimed is:

1. A blade construction for a fruit harvesting machine comprising a flexible blade having a base section for attachment to a rotary portion of the harvester, and tip portion at the end remote from said base portion for movement into lifting contact with fruit lying on the ground, said blade having a width several times its thickness and a length several times its width, said base section comprising a relatively small portion of the overall length of said blade, and at least one elongated depression in one surface of said blade extending substantially the entire length thereof from said base section to said tip parallel to the longitudinal axis of said blade.

2. The invention according to claim 1 wherein said blade is constructed of molded polyurethane plastic.

3. The invention according to claim 2 wherein said blade has an elongation of between about 350 and 600 percent.

4. The invention according to claim 1 wherein said base portion is essentially rectangular in cross section and said tip portion is of the same width and reduced in cross-section from said base portion.

5. The invention according to claim 4 wherein said blade is flat on the side thereof opposite said depression.

6. The invention according to claim 5 wherein two of said depressions are provided in spaced, parallel relation, the portions between and on each side of said depressions being of substantially the same thickness as said base portion.

7. The invention according to claim 1 wherein said blade has tensile strength of at least 2,000 p.s.i. and a Shore A hardness (10 seconds) of between about 80 and 90, and Shore D hardness (10 seconds) of between about 40 and 50.

* * * * *